United States Patent [19]
Soo

[11] Patent Number: 4,583,951
[45] Date of Patent: Apr. 22, 1986

[54] ROLL-TYPE LEARNING AID APPARATUS FOR READING AND MEMORIZING

[75] Inventor: Choi Y. Soo, Seoul, Rep. of Korea

[73] Assignee: Foundation Korea Campus Crusade for Christ, Seoul, Rep. of Korea

[21] Appl. No.: 743,597

[22] Filed: Jun. 11, 1985

[30] Foreign Application Priority Data

Feb. 18, 1985 [KR] Rep. of Korea ............ 85-1633[U]

[51] Int. Cl.⁴ ............... G09B 17/00; G09F 11/18
[52] U.S. Cl. ............................ 434/178; 40/522
[58] Field of Search ........... 434/178, 179, 426, 197, 434/182, 173, 348, 349; 40/518, 519, 520, 521, 522, 523

[56] References Cited

U.S. PATENT DOCUMENTS

| | | | |
|---|---|---|---|
| 621,017 | 3/1899 | Bellet | 40/522 |
| 838,840 | 12/1906 | Campman | 434/178 |
| 1,165,219 | 12/1915 | Ancona et al. | 40/522 |
| 1,706,550 | 3/1929 | Stader | 434/182 |
| 2,517,055 | 8/1950 | Thompson | 40/523 |
| 3,302,309 | 2/1967 | Macomber | 434/182 |
| 4,445,864 | 5/1984 | Price | 434/178 |

Primary Examiner—William H. Grieb
Attorney, Agent, or Firm—Bacon & Thomas

[57] ABSTRACT

A roll-type apparatus as a learning aid for reading and memorizing, the apparatus including a case provided with a display window therein, a word-listed paper ribbon wound about a pair of roll-shafts, forward and backward knobs interlocked with the roll-shafts by pinions, and guide rods for maintaining the ribbon under tension and in alignment with the display window during travel between the roll-shafts.

1 Claim, 2 Drawing Figures

FIG. 1
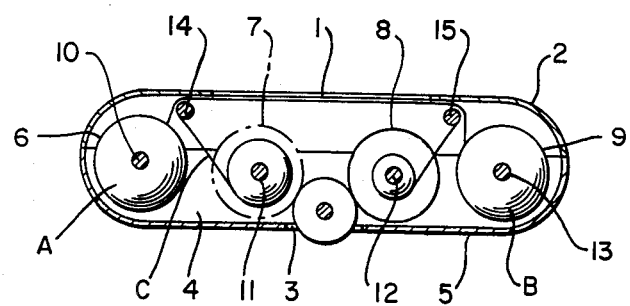
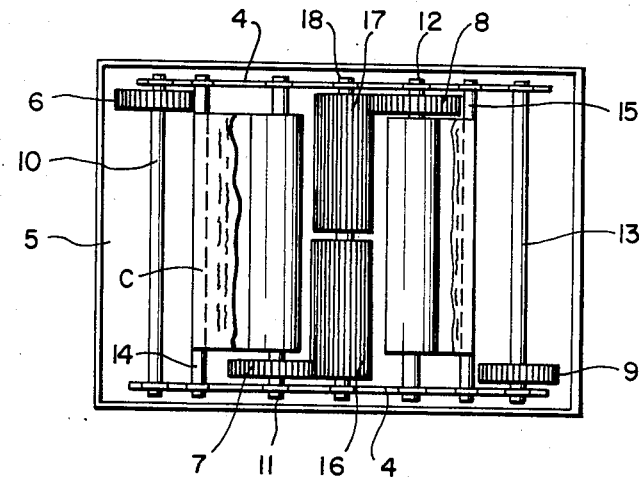
FIG. 2

ROLL-TYPE LEARNING AID APPARATUS FOR READING AND MEMORIZING

This invention relates to roll-type learning aid apparatus for reading and memorizing English words or Chinese characters etc.

Among many conventional learning aid apparatuses well-known heretofore, roll-type apparatus has been widely used because of easy handling and small size as compared to the number of listed-words. In said conventional learning aid apparatus, a pair of rolls around which a word-listed paper ribbon is wound are tightly inserted in transparent vinyl tube of the same length as said rolls. As users rotate both the roll-papers forwards or backwards, the word-listed paper ribbon travels from on roll-paper to other one and is therefore displayed continuously through the transparent vinyl tube. However, as used repeatedly, the paper-rolls are not easily rotated since vinyl tube is expanded and the windings of paper ribbon become loose.

Accordingly it is an object of the present invention to provide a novel roll-type learning aid apparatus which can be handled with facility and can list a large number of words, etc.

In accordance with this invention roll-type learning aid apparatus comprises a rectangular case consisting of a lid part with a display window and a bottom part with a transverse long-hole formed thereon, a pair of roll-shafts which are rotatably supported over two supporting walls disposed oppositely within said case, a word-listed paper ribbon being wound around both the roll-shafts, a forward knob and a backward knob which are interlocked with the roll-shafts by pinions respectively and partly projected outward the bottom part of said case, and two guide rods which serve to maintain the word-listed paper ribbon in parallel with the display window under tension when it travels from one roll-shaft to other one.

The invention further comprised one or two spare roll-shafts to be exchanged for said roll-shafts in use after reading and memorizing the words listed the paper ribbon wound around them.

The invention is further illustrated by a description, by way of example, of the preferred embodiment with reference to the accompanying drawings, in which:

FIG. 1 is a vertical cross-sectional view of an apparatus in accordance with one embodiment of this invention, and FIG. 2 is a top view of the apparatus of FIG. 1 with the lid part removed.

Referring to FIGS. 1 and 2, the preferred roll-type learning aid apparatus in accordance with the invention comprises a rectangular case consisting of a lid part 2 and a bottom part 5. A display window 1 is formed on the lid part 2. The bottom part 5 has a transverse long-hole 3 formed thereon and two supporting walls 4 disposed oppositely therein.

The supporting walls rotatably support four roll-shafts 10, 11, 12 and 13 which hold four pinions 6, 7, 8 and 9 respectively and around which a word-listed paper ribbon C is wound. Above the roll shafts 10, 11, 12 and 13, two guide rods 14 and 15 are disposed beneath the lid part 2. For the convenience of description, the roll-shafts 10 and 13 are hereinafter referred to spare roll-shafts. Below the roll-shafts 11 and 12, a knob-shaft 18 is disposed their between for supporting both a forward knob 16 and a backward knob 17.

As shown in FIG. 2, the knobs 16 and 17 are partly projected outward the bottom part 5 of case and may be rotated independently each other. The forward knob 16 is rotatably engaged to the pinion 7 of one roll-shaft 11 and also the backward knob 17 to the pinion 8 of other roll-shaft 12.

The spare roll-shafts 10 and 13 are provided with word-listed paper ribbons A or B respectively other than the paper ribbon C. Therefore the roll-shafts 11 and 12 may be exchanged for said spare roll-shafts 10 and 13, if desired.

The word-listed paper ribbon C extends to the roll-shaft 12 via the guide rods 14 and 15 from the roll-shaft 11. As the forward know 16 is driven, the roll-shaft 11 is rotated by the pinion 7 engaged to said knob 16 and therefore the word-listed paper ribbon C is travelling from the roll shaft 13 to the roll-shaft 11 in parallel with the display window 1 under tension. On the contrary, the backward knob 17 is driven, the roll-shaft 12 will be rotated by the pinion 8 interlocked with said knob 17 and the travelling of paper ribbon will be in the opposite direction.

In this manner, as users operate optionally the forward knob 16 or the backward knob 17, the rotation of the roll-shafts 11 and 12 i.e. the travelling of the word-listed paper ribbon C may be forward or reversed. Since the forward knob 16 and backward knob 17 are driven in the same direction, its handling will be more convenient.

In order to exchange the roll-shaft in use for spare roll-shaft 10 or 13, the lid part 2 is detachable from the bottom part 5 by a suitable means.

Although this invention has been described in detail with reference to a preferred embodiment, it is appreciated that this invention comprised other embodiments which are within the spirit and the scope of the claims. For example the present invention is applicable for reading and memorizing the mathematical or chemical formula as well as English words and Chinese characters, i.e. anything intended to read and memorize.

What is claimed is:

1. A roll-type learning aid apparatus for reading and memorizing English words or Chinese characters etc., comprising a rectangular case consisting of a lid part with a display window and a bottom part with a transverse long-hole formed thereon, a pair of roll-shafts which are rotatably supported over two supporting walls disposed oppositely within said case, a word-listed paper ribbon being wound around both said roll-shafts, a forward knob and a backward knob which are interlocked with the roll-shafts by pinions respectively and partly projected outward the bottom part of case, and two guide rods which serve to maintain the word-listed paper ribbon in parallel with the display window under tension when it travels from one roll-shaft to other roll-shaft.

* * * * *